Jan. 3, 1928.
I. B. HOROWITZ
1,654,879
VARIABLE SPEED GEAR SHIFT
Filed March 10, 1924
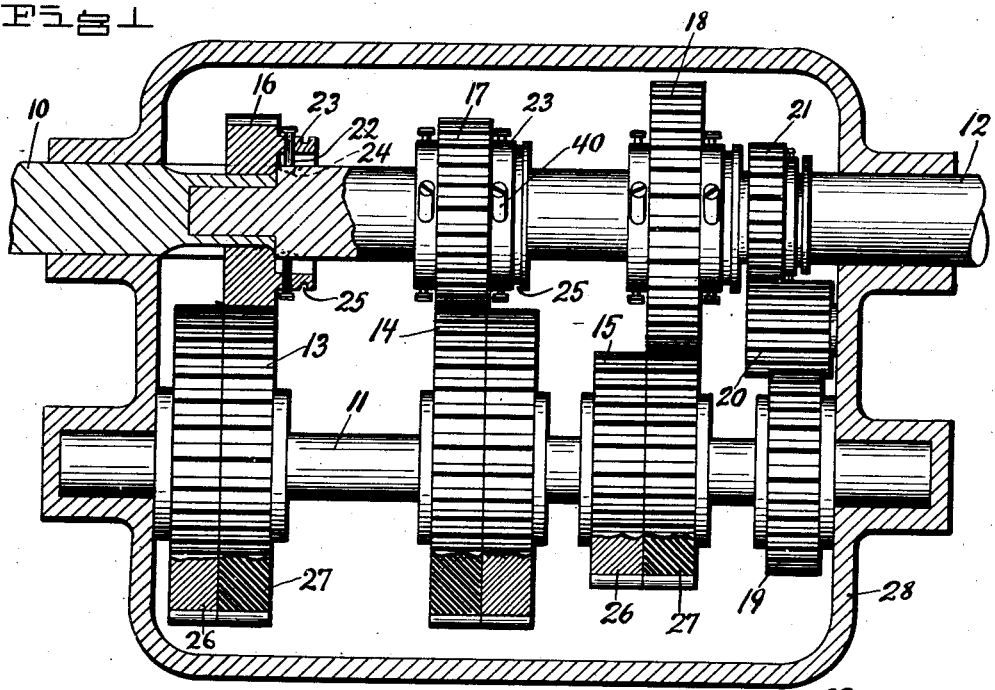
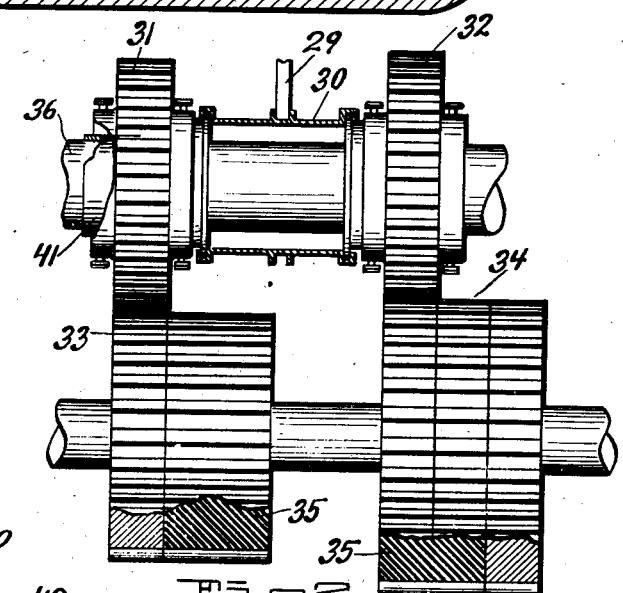
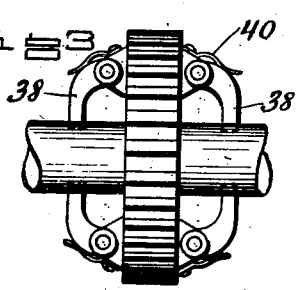
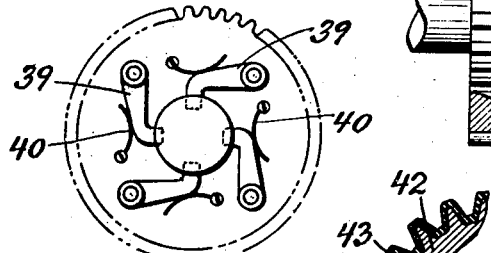
Inventor
Isaac B. Horowitz
By his Attorney Patented Jan. 3, 1928.

1,654,879

UNITED STATES PATENT OFFICE.

ISAAC B. HOROWITZ, OF NEW YORK, N. Y.

VARIABLE-SPEED GEAR SHIFT.

Application filed March 10, 1924. Serial No. 697,997.

This invention relates generally to transmission gear-sets such as used in motor vehicles and more particularly to a gear-set of the selective sliding gear type in which the various speed combinations are produced without the clashing of gears.

The invention includes a gear-set construction in which the various interengaging gears are maintained constantly in mesh and in which certain of the gears are permitted to rotate idly on the shaft under certain desired speed conditions and are coupled to the shaft under other desired speed conditions. The coupling operation referred to is preferably accomplished through the use of suitable locking elements such as pins or pawls on one member cooperating with slots or grooves in the other member to bring about the desired locking of the gear to its shaft. The coupling or uncoupling operation is effected by moving one of the gears, which may be appropriately referred to as the coupling or shift gear, longitudinally of its shaft to thereby bring the locking elements into or out of locking relation to the slots. In order to prevent disengagement of the intermediate pair of gears in the movement of the coupling or shift gear, the other gear has a sufficiently greater width axially to maintain the desired constantly meshed engagement regardless of the position of the coupling or shift gear.

Another feature of the invention resides in the provision of noiselesss non-metallic gear sections which are engaged in the idle condition of the respective pairs of gears. This structural feature eliminates the grinding noise that would be present in a transmission in which all gears are constantly meshed and in motion, while the constant meshing of gears does away with the noisy and harmful clashing that takes place during unsuccessful attempts at speed changing.

In the drawings in which a preferred embodiment of the invention has been selected for illustration, Figure 1 is a view partially in plan and partially in horizontal section of a selective gear-set embodying the invention.

Figure 2 is a fragmentary view of a gear-set showing another embodiment of the invention.

Figure 3 is a detail view showing a modified form of coupling means included in the invention.

Figure 4 is a view similar to Figure 3 showing still another form of coupling means that may be used as part of the invention.

Figure 5 is a fragmentary sectional view showing another form of gear that may be used with the invention.

Referring to the drawings for a more detailed description of the invention, a gear-set is shown in Figure 1 of the general type used to form part of a transmission system for motor vehicles. The gear-set shown includes constantly driven clutch shaft 10, a counter shaft 11 and a main or driving shaft 12. The driving shaft 12 and the counter shaft 11 are parallel to each other as in the usual construction and the counter shaft 11 is provided with gears 13, 14 and 15 mounted to rotate constantly therewith, the gear 13 being in constant engagement with a driving gear 16 mounted on the end of the clutch shaft 10 which forms a driving shaft for the entire assembly.

The counter shaft gear 14 is in constant meshing engagement with a gear 17 on the main shaft 10 and provides an intermediate speed driving connection between the counter shaft 11 and the main shaft 12. In like manner the counter shaft gear 15 forms a driving connection with the gear 18 on the main shaft 12 and provides a low gear connection therewith. A reverse gear connection is provided through a gear 19 on the counter shaft, an idler gear 20 and a gear 21 mounted on the main shaft 12.

An important feature of the invention resides in the constant meshing engagement which is maintained between the respective pairs of gears referred to during all conditions of operation. This arrangement, by which the objectionable clashing of gears which is characteristic of selective transmission gear-sets heretofore known, is eliminated, is provided by so mounting the various driven gears on the main shaft 12 that they are permitted to rotate idly on the shaft when the particular speed combination for which they are designed is not desired. This is effected by mounting the driven gears 17, 18 and 21 on the main shaft 12 in such manner that they are free to rotate idly on the shaft except when coupled thereto by locking means which may take various forms within the limits of the invention. In Figure 1 of the drawing the locking means referred to takes the form of radially movable pin element 22 mounted to slide through hubs or collars 23 mounted on the ends of the respective gears and to register with suitabel notches 24 formed in the shaft 12 at the necessary positions to bring about the desired locking engagement of the respective pairs of gears to effect the desired speed condition.

Means are provided for moving the driven gears 17, 18 or 21 longitudinally of the main shaft 12 to thereby permit the locking pins 22 to enter the slots 24 or to be withdrawn therefrom as the operating conditions may make necessary. The means referred to may include any desired connection between a hand operating lever and circumferentially grooved collar 25 provided on each gear mounted on the main shaft 12.

In order to permit of movement of the driven gears 17, 18 or 21 longitudinally of the main shaft 12 to thereby produce the coupling or uncoupling function referred to without bringing about a disengagement of the teeth of the mutually engaging gears, the driving gears 14, 15 and 19 on the counter shaft 11 are formed with an axial width greater than that of the width of the driven gears 17, 18 and 21. By this arrangement it will be seen that movement of the driven gears 17, 18 and 21 into coupling or uncoupling relation to the main shaft 12 can be effected without moving the teeth of the driven gears out of engagement with the teeth of the driving gears on the shaft 11.

Another feature of the invention resides in the use of non-metallic noise-preventing material for the construction of the sections of the driving gears 14, 15 and 19 which are in engagement with the driven gears 17, 18 and 21 when the driven gears are in uncoupled or idle relation to the main shaft 12. In other words, each of the driving gears 14 and 15 is provided with a metallic section 26 which is engaged by the corresponding driven gear when the driven gear is in coupled relation to the main shaft, while the other sections 27 of the driving gears which are in meshing engagement with the driven gears during the idle rotation thereof are formed of any suitable non-metallic material such as rawhide, fabric, phenolic condensation products or the like.

A similar relation obtains between the driving gear 16 mounted on the clutch shaft 10 and the driven gear 13 mounted on the counter shaft 11 except that the driving gear 16 is keyed to the shaft 10 so that it always rotates with the rotation of the shaft 10. However, the gear 16 is movable longitudinally of the shaft 10 to bring the locking pins 22 carried thereby into or out of driving relation to the notches 24 formed in the adjacent end of the main drive shaft 12. It will be seen that when the locking pins 22 of the driving gear 16 are thus engaged with the notches 24 in the shaft 12 that a direct driving relation is attained between the clutch shaft 10 and the main shaft 12, this relation being the high speed combination of the gear-set construction.

The gear 13 is also provided with a metallic section 26 and a non-metallic section 27 as is the case with gears 14 and 15 on the counter shaft 11 and also pinion 20. By this arrangement it will be seen that when the driving gear 16 is withdrawn from coupled relation to the main shaft 12 it is brought into engagement with the metallic portion 26 of the driven gear 13.

In order to effect an economy of space and thereby restrict the size of the transmission case 28 which is used to house the gear-set parts, I contemplate the use of a single gear moving fork or member 29 cooperating with a sleeve or other member 30 connecting a pair of driven gears 31 and 32 as in Figure 2 of the drawing. The sleeve 30 while maintaining a constant space relation between the pair of driven gears permits relative rotative movement of the gears with respect to this sleeve and to each other as will be clear.

It will be seen that the driving gears 33 and 34 used in the construction shown in Figure 2 are provided with a non-metallic section 35 of increased width over that of the corresponding sections 27 shown in Figure 1 of the drawing. The purpose of this is, as will be seen, to provide for the simultaneous disengagement of both driven gears 31 and 32 with the shaft 36 on which they are mounted.

Other means than the pin 22 and slot 24 connection may be provided for locking the gears to their shafts. For instance in Figure 3 of the drawing a set of pivoted pawl or dog members 38 is provided which are hinged to swing about axes transverse to the axis of the gear and into and out of engagement with the notches in the shaft. In Figure 4 of the drawing still another form of locking means is shown which consists of pivoted pawl or dog members 39 mounted to swing about axes parallel to the axes of the gear as indicated. Preferably in all the forms of locking means shown spring members 40 are provided for pressing the locking pins or pawls into the slots 24 in the shaft. It will be seen that the slots have a spoon or curved formation at their ends to facilitate the movement of the locking members out of the slots when the gears are shifted to uncoupled position.

In order to obviate wear on the shaft 12 through the idle rotation thereon of the driven gear, I contemplate the use of sleeve or bushing members 41 as shown in Figure 2 which may be placed in the appropriate positions on the shaft and replaced when they have become worn, as required.

While I have referred to the use of a metal section and a non-metal section in the wide-faced gears on the counter shaft, I wish to have it understood that the wide gears may be formed wholly of metal for heavy duty vehicles, and also that wide gears made wholly of non-metallic material may be employed where circumstances make the use of such material desirable. I contemplate also the use of gears whose body portion is formed of metal, as at 42 in Figure 5, forming a support or reinforcement for non-metallic material 43 used to face the gears and having meshing engagement with the associated gears.

I further wish to have it understood that while I prefer to have one gear wider than the corresponding gear with which it is in mesh for the purpose of reducing the contacting surface and thereby reduce friction at all times, that this is not an indispensible condition, and that both driven and driving gears may have a width sufficient to keep them in constant mesh when either one of the gears is shifted into locked or unlocked condition in relation to its shaft I also wish to have it understood that either the driving or the driven gear may have a metallic and a non-metallic section and, in the latter case, of course, the metallic section being in mesh with the corresponding metallic section when in driving position and the non-metallic section being in mesh with a non-metallic section in the idling position.

What I claim is:—

1. In a variable speed gear set, a pair of intermeshing gears, one of said gears being movable along its shaft and arranged to rotate idly on the shaft in one of the positions to which it may be moved, means carried by said gear and movable with relation thereto for interlocking the gear directly with the shaft in another position of the gear, and the other gear having an axial width sufficient to remain in meshing engagement with the axially movable gear in all the positions to which said gear may be moved.

2. In a variable speed gear set, a pair of intermeshing gears, the driven gear of said pair being movable along its shaft and arranged to rotate idly on the shaft in one of the positions to which it may be moved, means carried by the gear and movable with relation thereto for interlocking the gear with the shaft in another position of the gear, and the driving gear having an axial width sufficient to remain in meshing engagement with the driven gear in all the positions to which the driven gear may be moved.

3. In a variable speed gear set, a pair of intermeshing gears, one of said gears being movable along its shaft and arranged to rotate idly on the shaft in one of the positions to which it may be moved, radially movable means carried by the gear for coupling the gear to the shaft in one of the positions to which the gear can be moved, and the other gear having a width sufficient to remain in meshing engagement with the driven gear in all the positions to which the driven gear may be moved.

4. In a variable speed gear-set for motor vehicles, a pair of intermeshing gears, one of said gears being movable along its shaft and arranged to rotate idly on the shaft in one of the positions to which it may be moved, means for interlocking the gear with the shaft in another position of the gear, the other gear having an axial width sufficent to remain in meshing engagement with the axially movable gear in all the positions to which said gear may be moved, said wide gear being formed of metal in the portion meshing with the movable gear in the shaft interlocked position thereof and formed of non-metallic material in the portion meshing with the movable gear in the idle portion thereof.

5. In a variable speed gear-set for motor vehicles, a clutch shaft, a main drive shaft journaled in the end of the clutch shaft, a gear mounted on the end of the clutch shaft for rotation therewith, said gear having a splined connection with said shaft for longitudinal movement thereon, means for interlocking the gear with the adjacent end of the main drive shaft in one of the positions of the gear to thereby couple the clutch shaft and the main drive shaft together, a countershaft adapted to be driven by said gear, and a gear on the counter-shaft meshing with said gear on the clutch shaft in both the locked and the unlocked condition of the clutch shaft gear with the main drive shaft.

6. In a variable speed gear-set for motor vehicles, a clutch shaft, a main drive shaft journaled in the end of the clutch shaft, a gear mounted on the end of the clutch shaft for rotation therewith, said gear having a splined connection with said shaft for longitudinal movement thereon, a counter shaft, gear connections between the counter shaft and the drive shaft, a driven gear on the counter shaft in meshing engagement with the gear on the clutch shaft, said driven gear having a width sufficient to remain in meshing engagement with the other gear in all the positions thereof, means for interlocking the gear on the clutch shaft with the adjacent end of the main drive shaft in one of the positions thereof to thereby couple the clutch shaft and the main drive shaft together and said driven gear on the counter shaft being formed of metal in the portion engaging the clutch shaft gear in the indirect drive position thereof and formed of non-metallic material in the portion engaging the clutch shaft gear in the position thereof wherein the gear is interlocked with the main drive shaft.

ISAAC B. HOROWITZ.